Patented Sept. 23, 1947

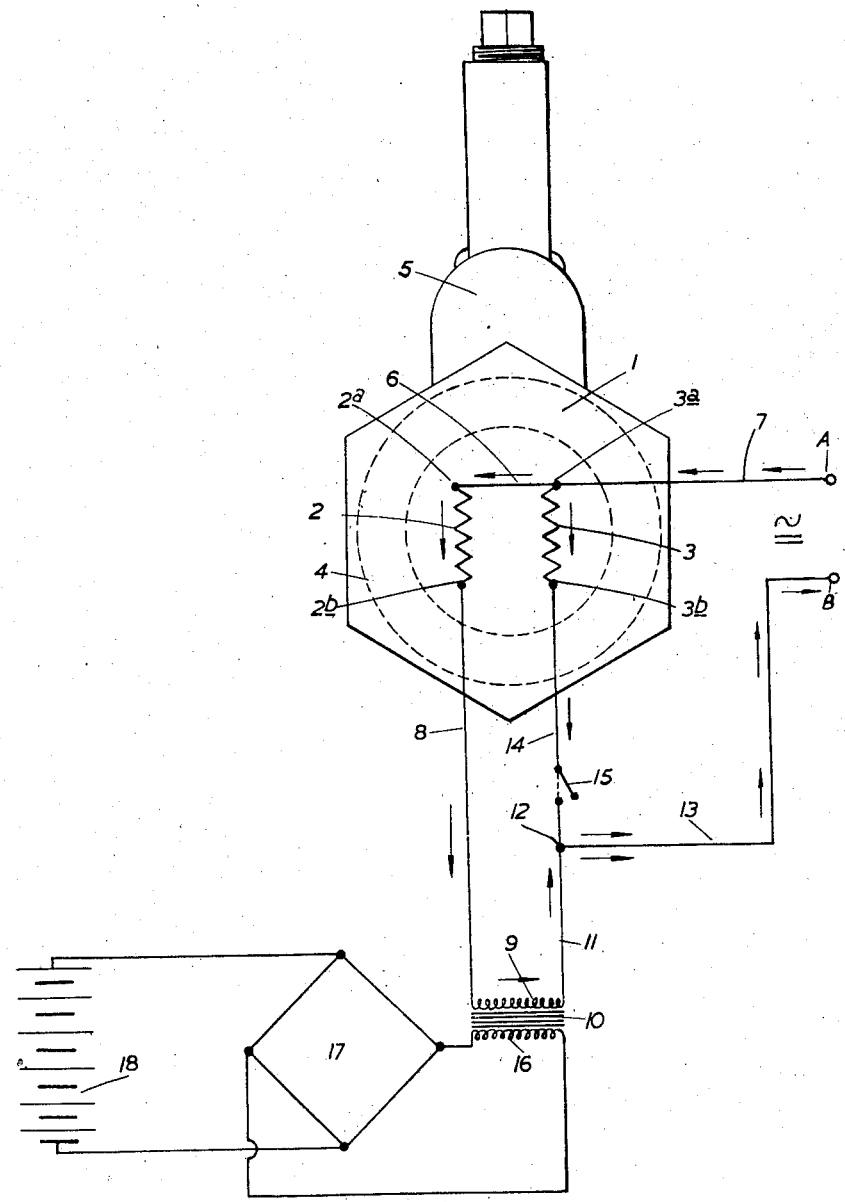

2,427,713

UNITED STATES PATENT OFFICE 2,427,713

COMBINED ELECTRIC RESISTANCE HEATER AND BATTERY CHARGER

Percy Graham Caldwell, London, England

Application September 23, 1943, Serial No. 503,496
In Great Britain April 16, 1943

2 Claims. (Cl. 219—20)

The invention relates to, and has for its objects the provision of improvements in electric resistance heaters and circuit arrangements therefor adaptable also for battery charging.

An electric resistance heater particularly one which conforms to the liquid flow through type incorporating an immersion heater unit, has been found to be useful in connection with the heating of the liquid, usually water, of the engine cooling system of a motor vehicle when the vehicle is standing idle and so as to maintain the engine at a satisfactory temperature for efficient working when started up. Moreover, it has been hitherto proposed also to employ the heater as a resistance unit in a circuit arrangement for charging a storage battery, a suitable rectifier being included in the charging circuit for the battery when the unit is energised from an alternating current supply. As the invention is particularly applicable to a heater thus used for a motor vehicle it will be described hereinafter in that application, although the heating for other purposes is not excluded.

Now, an object of the present invention is to provide a simple and reliable circuit arrangement whereby one and the same electric heater apparatus can be used on an alternating current supply to charge storage batteries of different voltage over a considerable range extending say from 2 to 24 volts and hence to charge, e. g., either a 6 volt or 12 volt battery, without any change over switching whilst keeping the charging rate the same or substantially the same in each case, and ensuring at all times a high degree of electrical safety.

A further object of the present invention is to provide a simple and reliable arrangement whereby one and the same electric heater apparatus can be rendered usable on alternating current or direct current supply, without any change over switching and readily available for battery charging when alternating current is used, the arrangement affording at all times a high degree of electrical safety.

In the illustrated embodiments of the present invention a circuit arrangement for an electric resistance heater is provided with an electric resistance heating element connectable so as to be energised with alternating current or direct current heating current from a main supply source, the resistance element being connected in series circuit relation with the primary winding of a transformer, and the secondary winding of the transformer being arranged and effective to supply, through a rectifier, charging current for a battery only when the heating current is alternating current, whilst for operating the heater on a direct current main supply, and consequently without effecting battery charging from the secondary winding of the transformer, the wire of the primary winding of the transformer is formed sufficiently heavy in section to carry the current passing through the heating element without becoming overheated or burnt out. In this latter condition of operation, the transformer due to its secondary winding being then ineffective to supply battery charging current, forms a simple and reliable means for minimising the risk of electric shock that is liable to occur where either the positive or negative side of the battery is connected to the frame of the vehicle and the frame is used as a common pole of associated electrical apparatus and such frame is in a live line of the circuit. This latter arrangement moreover, is preferably so arranged as to be usable, when alternating current is used, to charge batteries of different voltages, e. g., either a 6 volt or a 12 volt battery without any change over switching. To this latter end the transformer is so proportioned that the secondary voltage adjusts itself to the back electro-motive force of batteries of different voltage. For additional heating purposes the heater is provided with a further electric resistance heating element connectable with the supply in parallel with the first heating element in a circuit excluding the primary winding of the transformer, whereby only the first heating element is in series circuit relation with said primary winding.

The transformer is constructed in the same manner as a current transformer, i. e., for the transformation of current from one value to another, usually lower, value as defined in the British Standards Institute Glossary of Electrical Terms. The transformer has the design characteristics of a current transformer and has a definite current ratio, preferably being designed to step-down current. It is essential for the purposes of the present invention that the primary winding of the transformer be connected in series circuit relation with the heating element 2 and the secondary winding of the transformer connected to the battery charging circuit which includes the rectifier and that the transformer is proportioned so that for any battery being supplied with the charging current and of a voltage falling within a substantial range of voltages, the values of which are low compared with that of the source of the current, the secondary voltage adjusts itself to the back electromotive force of such battery without any change-over switching and the charging rate remains the same.

By means of a switch included in the circuit which excludes the primary winding of the transformer the aforesaid second heating element can thereby be caused to be energised additionally at choice.

The invention itself, both as to its organization and its method of operation, will be best understood from the following description when read in connection with the accompanying drawing which is a schematic electrical circuit diagram of apparatus arranged in accordance with the invention.

In this drawing is shown, in end view, the head end portion 1 of an immersion heater unit comprising a pair of resistance heating elements consisting of a main element 2 and an auxiliary element 3, represented diagrammatically, and preferably each being of the loop rod resistance type extending longitudinally within a normally horizontally disposed cylinder 4. The resistance elements may be rated for the same or different wattage consumption, e. g., each capable of consuming 500 watts or for use in severe cold conditions, the element 2 500 watts and the element 3 1000 watts. The cylinder 4 is adapted to receive liquid to be heated, the liquid being thereafter discharged by way of a header 5 surmounting the cylinder 4. A heater corresponding generally to this form is disclosed by my United States Patent No. 2,367,197, dated January 16, 1945.

By means of a conductor 6, a terminal 2a at one end of the main heating element 2 is electrically connected with a terminal 3a at a corresponding end of the auxiliary element 3 and to this latter terminal 3a is also connected a conductor 7 connected to one terminal A of an alternating current or direct current main. A terminal 2b at the other end of the main element 2 is connected by a conductor 8 to one end of the primary winding 9 of a transformer 10, the other end of this winding being connected through a conductor 11 to a so-called common terminal 12 from which is led a conductor 13 to the other terminal B of the direct current or alternating current mains. Moreover, to this so-called common terminal 12 is connected also a conductor 14 leading from a terminal 3b at the other end of the auxiliary element 3 and including an interrupting switch 15.

The switch 15 therefore serves to allow of the auxiliary heating element 3 being energised in parallel with the main element 2 in a circuit leading from the auxiliary element 3 through the so-called common terminal 12 and back to the mains, this circuit being one which does not include the primary winding 9 of the transformer 10.

The secondary winding 16 of the transformer 10 is connected in suitable manner to feed into a rectifier 17 which in turn is suitably connected for delivering rectified charging current to a battery 18, it being understood of course that the secondary winding 16 is rendered effective for this purpose only when the heater is connected to an alternating current supply, there being no induction from the primary winding 9 when the heater is connected to a direct current supply. The wire employed for the construction of the primary winding is formed sufficiently heavy to withstand overheating when the energisation of the main heater element in the arrangement described is direct current.

The proportions and values of the arrangement described may be such that with the main element 2 capable of consuming 500 watts so as to result in a current of 2 amps. being delivered to the primary winding 9 of the transformer, the secondary winding 16 when alternating current is in use delivers a current of 1.2 amps. feeding into the rectifier so as to give 1 amp. charging of a 6 volt battery or 0.95 amps. charging in the case of a 12 volt battery. In this connection it has been found that the circuit as a whole balances itself out, the voltage adjusting itself to the back E. M. F. of the battery and the hysteresis of the transformer appearing to vary and the rectifier apparently adjusting itself to the required conditions.

On the whole, it may be stated that the transformer is so proportioned that the secondary voltage adjusts itself to the back E. M. F. of say a 6 volt or a 12 volt battery, the amount of current passing into the primary being held constant by the amount of current passed by the heating element. It must be noted that the actual primary current in the transformer is equal to the supply mains voltage divided by the impedances of the heating resistance and the transformer primary added together, the impedance of the transformer primary being a very small value compared with the impedance of the heating resistance, e. g., 95% of the impedance is due to the heating resistance and 5% to the transformer primary. Also, it is to be understood as preferable that the transformer should have an input to its primary of the order of 2 amps., the output being of the order of 1 amp. In general a ratio of 1.70 to 1.00 of the turns of the primary and secondary windings serves well. Where the transformer is employed for the charging of a 24 volt battery the charging rate would be substantially the same.

A circuit arrangement substantially as herein described but without the wire of the primary winding being made heavy enough to operate on a direct current main supply, can be used on an alternating current supply to charge batteries of different voltage, e. g., either a 6 volt or 12 volt or 24 volt battery without any change over switching, and the charging rate would be the same or substantially the same in each case. Thus it is only necessary to manufacture one standard charging box instead of either two boxes, or one box requiring to be furnished with a tapped secondary winding and a change over switching arrangement according as it is desired to charge the lower or higher voltage battery.

With the wire of the primary made heavy enough to operate on a direct current main supply, a circuit arrangement substantially as herein described can be used on alternating current supply to charge batteries of different voltage, e. g., either a 6 volt or 12 volt or 24 volt battery without any change over switching whatever and the charging rate would again be the same or substantially the same in each case, when it is used on direct current supply it is electrically safe because no mains voltage current is in communication with the frame of the motor vehicle whilst the insulation of the circuit arrangement will generally be of a high order, for example, one requiring 2000 volts to break through the insulation.

Alternating current of commercial frequency, such for instance as that which is furnished by a standard house service 50-cycle alternating current supply, is generally referred to herein.

While I have illustrated a particular embodiment of the invention and have described the same and modifications for the purpose of explaining the principle of operation, it will be obvious that further modifications may be made without departing from the spirit of my invention, and I therefore aim to cover all such modifications as fairly fall within the spirit and scope of my invention as set forth in the appended claims.

What I claim is:

1. In an electric heating and battery charging system, a heater having an electric resistance heating element therein, means for connecting said element in a heating circuit having terminals for connection to a source of alternating current heating current of ordinary commercial supply characteristics, a transformer including a primary winding and a secondary winding, means for connecting said primary winding in series circuit relation with said heating element, said primary winding having an impedance which is low compared with the impedance of said heating element, a battery charging circuit connected to be energised by said secondary winding so that the battery is charged by induced current and the transformer acts as a safety element between the battery and heater circuits, said charging circuit including a rectifier and means for supplying rectified charging current to a battery, and said transformer being proportioned so that for any battery being supplied with said charging current and of a voltage falling within a substantial range of voltages the values of which are low compared with that of said source the secondary voltage adjusts itself to the back electro-motive force of such battery without any change-over switching and the charging rate remains substantially the same.

2. In an electric heating and battery charging system, an electric heater having a resistance heating element therein, means for connecting said element in a heating circuit having terminals for connection to a supply source of electric heating current of ordinary commercial supply characteristics, a transformer including a primary winding and a secondary winding, said primary winding having an impedance which is low compared with the impedance of said heating element, means for connecting said primary winding in series circuit relation with said heating element, a battery charging circuit connected to be energized by said secondary winding so that the battery is charged by induced current and the transformer acts as a safety element between the battery and heater circuits, when said supply source is an alternating current source, said charging circuit including a rectifier and means for supplying rectified charging current to a battery, said transformer being so proportioned that for any battery being supplied with said charging current and of a voltage falling within a substantial range of voltages which are low compared with that of said source the secondary voltage adjusts itself to the back electro-motive force of such battery without any change-over switching and the charging rate remains substantially the same, said primary winding having its wire formed heavy enough to carry the current passing through the heating element without excessive heating or rupture of said winding when said supply source is a direct current source, and means for connecting a further heating element for energization from said source in parallel with the first heating element in a circuit excluding said primary winding.

PERCY GRAHAM CALDWELL.

REFERENCES CITED

The following references are of record in the file of this patent:

UNITED STATES PATENTS

| Number | Name | Date |
|---|---|---|
| 1,138,625 | Burnham | May 11, 1915 |
| 2,079,636 | Sharp | May 11, 1937 |
| 1,372,864 | Cox | Mar. 29, 1921 |